US010318993B2

(12) United States Patent
Baghaie et al.

(10) Patent No.: US 10,318,993 B2
(45) Date of Patent: Jun. 11, 2019

(54) CROSS-CHANNEL PERSONALIZED PROMOTION PLATFORM

(71) Applicant: Accenture Global Services Limited, Dublin (IE)

(72) Inventors: Marjan Baghaie, Seattle, WA (US); Kelly L. Dempski, Berkeley, CA (US)

(73) Assignee: Accenture Global Services Limited, Dublin (IE)

( * ) Notice: Subject to any disclaimer, the term of this patent is extended or adjusted under 35 U.S.C. 154(b) by 583 days.

(21) Appl. No.: 14/292,190

(22) Filed: May 30, 2014

(65) Prior Publication Data

US 2014/0358666 A1 Dec. 4, 2014

Related U.S. Application Data

(60) Provisional application No. 61/829,876, filed on May 31, 2013.

(51) Int. Cl.
*G06Q 30/02* (2012.01)

(52) U.S. Cl.
CPC ..... *G06Q 30/0267* (2013.01); *G06Q 30/0242* (2013.01); *G06Q 30/0261* (2013.01)

(58) Field of Classification Search
CPC ...................................................... G06Q 30/02
See application file for complete search history.

(56) References Cited

U.S. PATENT DOCUMENTS

| 6,587,835 | B1* | 7/2003 | Treyz ..................... G06Q 20/12 705/14.64 |
| 8,947,513 | B2* | 2/2015 | Ganick ................ G01C 21/206 348/61 |
| 2010/0121710 | A1* | 5/2010 | Chipman ............... G06Q 30/02 705/14.51 |
| 2011/0087550 | A1 | 4/2011 | Fordyce, III et al. |
| 2011/0238476 | A1 | 9/2011 | Carr et al. |
| 2012/0246003 | A1* | 9/2012 | Hart ................... G06Q 30/0241 705/14.57 |
| 2012/0259854 | A1* | 10/2012 | Hsiao ................. G06Q 30/0251 707/739 |

(Continued)

OTHER PUBLICATIONS

First Office Action issued in AU Application No. 2014202965, dated Dec. 5, 2014, pp. 1-5.

(Continued)

*Primary Examiner* — Sun M Li
*Assistant Examiner* — Thuy N Nguyen
(74) *Attorney, Agent, or Firm* — Brinks Gilson & Lione

(57) ABSTRACT

A platform for providing real-time promotions determines a customer interested in a product or service. The platform identifies customer information associated with the customer, as well as a set of products of interest to the customer. The platform identifies a supplier or advertiser associated with each of the products and receives promotion bids from one or more of the suppliers or advertisers. The platform generates a score for each of the received promotion bids, selects at least one of the promotion bids for transmission to the mobile device, and transmits the selected at least one promotion bids to the mobile device. The platform tracks customer behavior associated with the at least one promotion bids and provides the tracked behavior information back to the suppliers or advertisers.

20 Claims, 9 Drawing Sheets

(56) References Cited

U.S. PATENT DOCUMENTS

| | | | |
|---|---|---|---|
| 2013/0041761 A1 | 2/2013 | Voda | |
| 2014/0222685 A1* | 8/2014 | Middleton | G06Q 30/0261 |
| | | | 705/50 |
| 2014/0324627 A1* | 10/2014 | Haver | G06Q 30/0639 |
| | | | 705/26.9 |

OTHER PUBLICATIONS

Second Office Action issued in AU Application No. 2014202965, dated Apr. 7, 2015, pp. 1-5.

\* cited by examiner

ововgeneral # CROSS-CHANNEL PERSONALIZED PROMOTION PLATFORM

PRIORITY CLAIM

This application claims priority to U.S. Provisional Patent Application No. 61/829,876, filed May 31, 2013, which is incorporated herein by reference.

BACKGROUND

1. Technical Field

This application relates to real-time personalized promotions. In particular, this application relates to a platform for providing personalized promotions to customers in real-time.

2. Related Art

In the retail industry, technology has enabled customers to take more control of their shopping experiences, and new approaches to shopping and fulfillment have opened the doors to competition that would not have been viable just a few years ago. This however, has also opened up doors to many new possibilities for retailers to improve their game by leveraging the new technology.

The retail store helps match products with buyers, whether online or offline. The store's first matchmaking tool is the shelf: the customer sees something, and she buys it. More sophisticated stores get into more sophisticated forms of matchmaking—upselling, cross-selling, getting the customer to switch brand loyalty, etc. Most often this relies on the placement of the items on the shelf, e.g. placing pasta next to sauce on the shelf, or on trying to influence the customer outside of the shelf—through coupons distributed at the checkout, or similar. The pasta might make for a good cross-sell, but the coupons are often a weak way to shift a customer from Brand X to Brand Y. So, while the retailer serves as a matchmaker between the customer and Brand X or Y, it has limited services that it can offer X or Y to enhance that matchmaking.

In order to ensure that at least one relevant advertisement reaches a consumer, it may be necessary to send them a large selection of advertisements with the hope that at least one meets their requirements. However, this can inundate the customer with many irrelevant advertisements, as well as have a detrimental effect on battery resources as each advertisement still needs to be handled by the processor. Furthermore, an increase in network bandwidth may also be required to process these advertisement data.

A customer's attention while shopping in-store or on-line is valuable, but an under-utilized asset. A need therefore exists to leverage the wealth of information available about the customer in order to grab the attention of the customer at his/her point of decision during the shopping experience.

BRIEF DESCRIPTION OF THE DRAWINGS

The system may be better understood with reference to the following drawings and description. The elements in the figures are not necessarily to scale, emphasis instead being placed upon illustrating the principles of the type model. In the figures, like-referenced numerals designate corresponding features throughout the different views.

DETAILED DESCRIPTION

Figure 1:
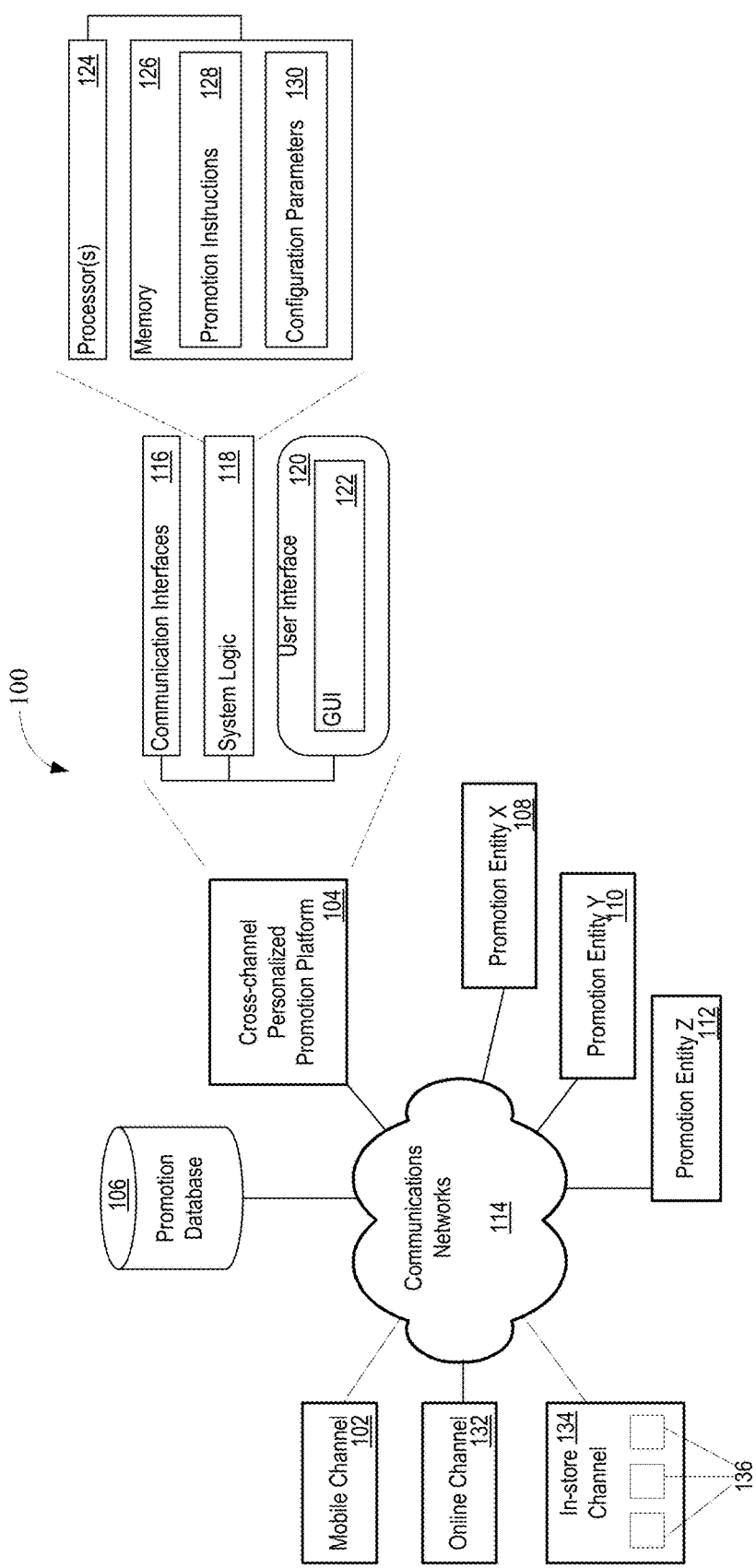
FIG. 1 shows an example of a cross-channel promotion architecture for facilitating customized and personalized interactions between customers, retailers, and advertisers/suppliers.

FIG. 1 shows an example of a cross-channel promotion architecture 100 for facilitating customized and personalized interactions between customers, retailers, and advertisers/suppliers across multiple communication channels, including a mobile channel 102, an online channel 132 and an in-store channel 134. The architecture 100 includes a promotion platform 104, a promotion database 106, and promotion entities 108, 110, 112, each of which may communicate via a communications network 114. A customer may communicate with the promotion platform 104 via the mobile channel 102 using a mobile device such as a cellular phone, tablet, smart phone, PDA or other mobile communication device configured to access the internet. The mobile device has installed thereon a promotion application, or a retailer application enhanced with promotion features, configured to communicate with the platform 104.

A customer may communicate with the platform 104 via the online channel 132 using a browser application installed on a network-enabled user portal. A browser based implementation allows platform features to be accessible regardless of the underlying platform of a user portal. For example, the user portals may each be a desktop, laptop, handheld computer, cell phone, mobile messaging device, network enabled television, digital video recorder, automobile, or other network enabled user portal, which may use a variety of hardware and/or software packages. The user portals may also connect to the platform 104 using a stand-alone application which may be platform-dependent or platform-independent.

A customer may communicate with the platform 104 via the in-store channel 134 by, for example, swiping or scanning a loyalty card while in the store, via an interactive (e.g., touch-screen) display at an aisle or other location within the store, using Bluetooth low energy beacons (referred to as wireless beacon systems) positioned at various locations in the store, or other in-shore methods.

The communications network 114 may be any private or public communications network or combination of networks. The communications network 114 may be configured to couple a computing device, such as a server, system, database, or other network enabled device, to another device to enable communication of data between computing devices. The communications network 114 may generally be enabled to employ any form of computer-readable media for communicating information from one computing device to another. The communications network 114 may include one or more of a wireless network, a wired network, a local area network (LAN), a wide area network (WAN), a direct connection such as through a Universal Serial Bus (USB) port, and the like, and may include the set of interconnected networks that make up the Internet. The communications network 114 may include any communication method by which information may travel between computing devices.

The promotion entities 108, 110, 112 each correspond to remote computer system, including a processor and memory, representing a supplier and/or advertiser of different goods or services. The database 106 may store data corresponding to the each promotion entity 108, 110, 112, as well as corresponding to customers using the promotion application or retail application enhanced with a promotion features. The platform 104 obtains customer information via one or more of the mobile channel 102, online channel 132 and in-store channel 134. The customer information may include location data, profile information, customer identity, customer behavior and purchase history, etc.

For example, with respect to the mobile channel 102 the platform 104 may obtain location data about the mobile device used by the customer. The location data may identify a retail store, aisle of a retail store, section of an aisle, and/or other information about the location of the customer using the mobile device. The location of the mobile device may be determined when the customer scans a Quick Response (QR) code, using a global positioning system (GPS), based on a MAC address at a store where Wi-Fi is available, using image recognition of a picture taken by a camera phone, based on an analysis of a shopping list in a shopping list application, or by other location tracking mechanisms. With respect to the online channel 132, the platform 104 may identify a customer when the customer logs into a retailer website using a browser application.

With respect to the in-store channel 134, the platform 104 may identify a customer when the customer swipes or scans a loyalty card at a display or other location in a retail store. Using the in-store channel, the platform 104 may also identify a customer and identify a location of the customer within the retail store using an indoor positioning system such as iBeacon®, which includes wireless beacons 136 positioned at various locations within, for example, a retail store. As will be described in more detail below, the platform 104 can then use this knowledge to provide useful and personalized messaging to the customer in real-time. The indoor positioning system is compatible with various mobile devices, including iOS devices with Bluetooth and Android devices with Bluetooth. The beacons 136 may be various sizes, including as small as a button, with a typical battery life of 2-5 years.

Based on the personalized data received from the mobile channel 102, in-store channel 134 (e.g., based on an indoor positioning system, when a loyalty card is swiped or scanned, when a QR code is scanned in-store, when a customer interacts with an in-store display), and/or from the online channel 132 (e.g., based on a collection of customer data stored by the platform, what on-line promotion(s) the customer is looking at, web search entered by a customer), the platform 104 determines what type of products the customer may be interested in. The platform 104 identifies suppliers and/or advertisers, corresponding to the promotion entities 108, 110, 112, associated with those products and sends information about the customer to the identified promotion entities. The platform 104 obtains promotion information from the promotion entitles 108, 110, 112. The promotion information may include coupons, discounts, reward points, or other promotions associated with a product or service proximate or related to a product or service the customer is interested in.

In the case of the mobile or in-store channels the promotion information may also include promotions proximate to the location of the mobile device or the location where the loyalty card is swiped or scanned. The promotion information may also include coupons, discounts, reward points, or other promotions associated with a product or service related to a search entered by a user in a browser application through the online channel 134. The platform 104 matches the customer information with the received promotions to select which promotion(s) to provide to the customer's mobile device, screen display, or to the customer through email, SMS text message, or other like methods. The platform 104 may push the selected promotion(s) to the mobile device or customer's computer for display. The customer may use these promotions at the retail store, or online, for the purchase of the corresponding products.

The platform 104 may obtain promotion information from the promotion entitles 108, 110, 112 through an auction mechanism in which the entities 108, 110, 112 submit bids along with the promotion the entity wishes to be displayed to the customer, or through a pre-set mechanism (pricing) that is changed from time to time by the advertisers or the retailer, or use tools provided by the platform to let the platform set the price or bid on their behalf (possibly within a pre-set budget). The platform 104 processes the bids in real-time and assigns a score to each bid. Based on the calculated scores, the platform 104 determines which promotions to send to the mobile device. The platform 104 sends the selected promotions to the mobile device and tracks the customer's behavior in relation to the selected promotions. The tracked behavior may be added to the customer profile stored in the database 106. The platform 104 may share the tracked behavior information with the entities 108, 110, 112 as feedback. The platform may also use this feedback to improve its own performance, optimization mechanisms and tools it offers to suppliers and retailers.

The promotion platform 104 may be implemented on a server managed by a retail store or by a third-party. Multiple retailers may operate the promotion platform 104 tailored to the particular retailer's business model and preferences. The database 106 may be specific to each retailer, or may store customer information associated with all participating retailers.

The promotion platform 104 may include communication interfaces 116 that connect the platform 104 to the networks 114, platform logic 118, and a user interface 120. The user interface 120 may display a graphical user interface 122. The user interface 120 facilitates setup, configuration, and monitoring of the platform 104.

The platform logic 118 implements in hardware, software, or both, any of the processing, user interfaces, reports, and other aspects of the platform shown or described below or in the Figures. As one example, the platform logic 118 may include one or more processors 124 and program and data memories 126. The program and data memories 126 hold, for example, promotion matching instructions 128. The data and program memories 126 may also hold promotion configuration parameters 130 that guide the operation of the platform 104.

The processors 124 execute the instructions 128, and the configuration parameters 130 may inform the processors 124 as to how to handle the specific aspects of the promotion processing described below and shown in the drawings. As a result, the processors 124 and instructions 128 implement the promotion techniques described below and shown in the Figures. The promotion platform 104 may accept input from the user interface 120 to change, view, add, or delete any of the configuration parameters 130 at any time.

The promotion platform 104 may be implemented in many different ways. For example, although some features may be shown or described as stored in computer-readable memories (e.g., as logic implemented as computer-executable instructions or as data structures in memory), all or part of the promotion platform 104 and its logic and data structures may be stored on, distributed across, or read from other machine-readable media. The media may include hard disks, floppy disks, CD-ROMs, DVDs, flash drives, a signal, such as a signal received from a network or received over multiple packets communicated across the network.

The promotion platform 104 may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the promotion platform 104 may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that performs the collaboration processing described in this document and shown in the Figures.

The promotion mechanism discussed herein may also be applied to physical shelf-placement arrangement of products in retail stores. Leveraging this platform for physical shelf-arrangement could eliminate the need (or reduce the burden) for on-going negotiations between retailers and suppliers on shelf-arrangement by automating the process and possibly making it into a bidding process, further benefiting the retailer (in terms of creating more competition). The ease of negotiation and the flexibility it offers is an added advantage for both retailers and suppliers of course.

Figure 2:
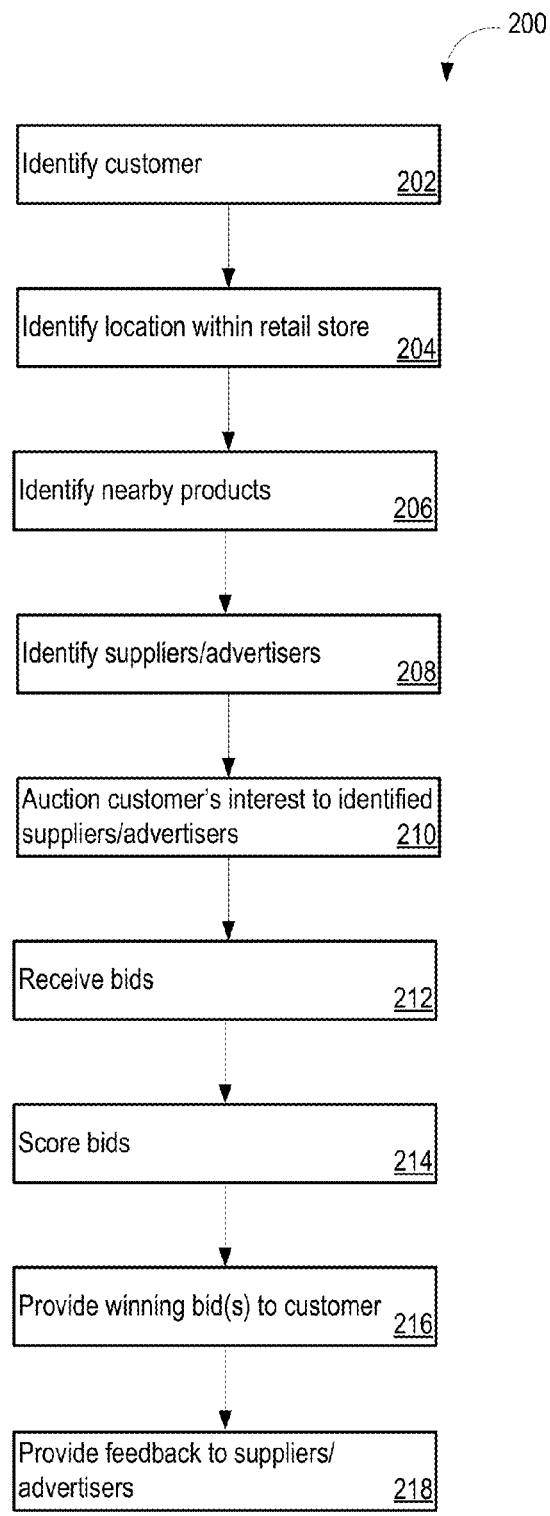
FIGS. 2-4 illustrate an example of a process by which a promotion platform provides customized promotions to a customer in real-time.

FIG. 2 shows an example of a process 200 by which a promotion platform, such as the platform 104 shown in FIG. 1, provides customized promotions to a customer in real-time. The promotion platform identifies a customer (202). With respect to the mobile channel, the platform may identify the mobile device, or the application running on the mobile device, that scanned a QR code and looks up customer information associated with the mobile device in the promotion database, or the customer might be logged in via their mobile device or be recognized through their browsing history or cookies or other similar methods. With respect to the online channel, the platform may look up customer information associated with a user logged into, for example, a retailer website, or use cookies providing information about the customer. With respect to the in-store channel, the platform may look up customer information associated with a loyalty card swiped or scanned by a user in a retail store, or when a QR code is scanned in-store.

The platform may also recognize a customer's mobile device using an indoor positioning system such as iBeacon®. The in-store positioning system may include wireless devices positioned at various locations within the retail store that enable sophisticated interaction between a customer's mobile device and their physical surrounding, e.g., the retail store. The beacons may be low-powered transmitters that broadcast an identification (ID) signal that can be detected by compatible mobile devices within close proximity. The range can be adjusted from just a few inches to over 30 feet, depending on the store's desired configuration. Beacons require virtually no user involvement in order to trigger a message. With the help of an app, the mobile device sends the beacon ID (and possibly a user ID) to a server, such as a cloud-based server. The server can then look up the identity and location of the user based on the received ID's and provide relevant customer information to the platform 104. The beacons may also passively collect data on customer's in-store movements, frequency of visits to specific sections or aisles of the store, movement patterns related to time of day, day of week, etc. This functionality can be integrated with the store's own existing app and backend systems to provide a familiar and personalized experience for their customers. The beacons may be associated with the retail store in which they are located, or may be installed by manufacturers/suppliers in a retail store next to the location within the store where their products are located.

The customer information acquired via one or more of the mobile, online, and in-store channels may include profile information about the customer, their social profile, purchase history at the retailer or at all retailers, budget, preferences, tastes, etc.

The platform identifies location data associated with the customer (204). With respect to the mobile channel the platform associates the scanned QR code with a location, e.g., aisle, shelf, etc., within the retail store. For example, consider a scenario which a customer enters a retail store to buy Yogurt. The customer has a mobile device equipped with a promotion application, or with an application for the retail store that is enhanced with features configured to communicate remotely with the promotion platform. At the Yogurt aisle the customer may scan the QR code displayed on the aisle with his/her smart phone. When the customer scans the QR code, the platform can look up in one or more databases the following information: an identification of the customer as the application the customer is using is tied to his identity; information about the customer's social profile (which may be associated with, for example, the customer's Facebook® profile); the customer's location in the store; the customer's previous purchase history; and information it has about the customer's taste, budget, etc. (which it can have calculated using algorithms using the customer's previous interactions with the platform and with the retailer).

With respect to the on-line channel the platform may identify location data based on the user's IP address, or based on the user's profile when the user logs in. With respect to the in-store channel, the platform may identify location data based on the beacon ID received from the mobile device when the mobile device is within the vicinity of a beacon positioned within the store. Using the location data, the indoor positioning system may determine, for example, whether the customer is shopping in the dairy section, produce section, or another section of the retail store.

Based on the determined identity and location of the customer, the platform estimates the customer's intent, or an identification of products the customer may be looking at (206). For example, the platform may identify products on the shelf where the QR code or loyalty card was scanned, or where the section of the store at which the customer is located based on the indoor positioning system. The platform may identify products or services related to a web search entered by a user in a retailer website, or related to the web page the user is viewing.

Figure 3:
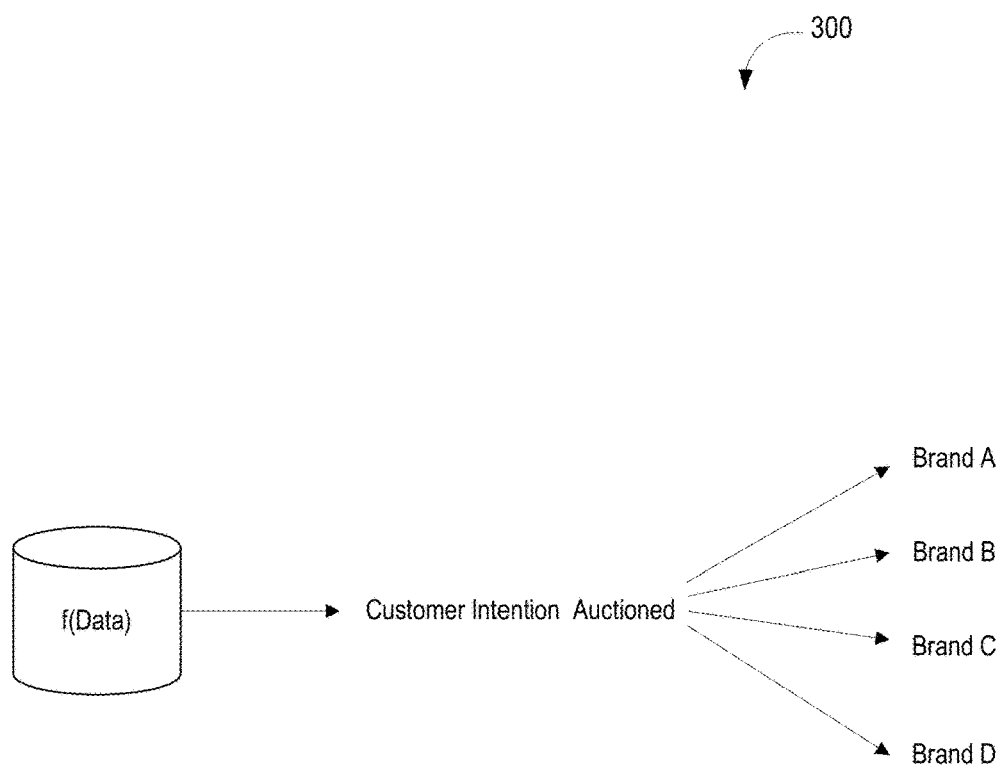

Based on the identified products or services and on the identity of the customer (or based on an anonymous aggregate that includes data about the customer with the actual identity stripped to preserve privacy), the platform identifies suppliers and/or advertisers of the identified products (208). The platform auctions the customer's interest to suppliers and/or advertisers of the products, e.g., of the presented on its shelf (210), as further illustrated in FIG. 3. The platform may provide as much or as little information as it sees fit to the supplier and/or advertiser, and picks as many or as few of the producers as it wants. If the product is yogurt for example, the platform might auction the information to yogurt producers available on that shelf, as well as to other related companies like weight loss companies or other yogurt related products.

Figure 4:
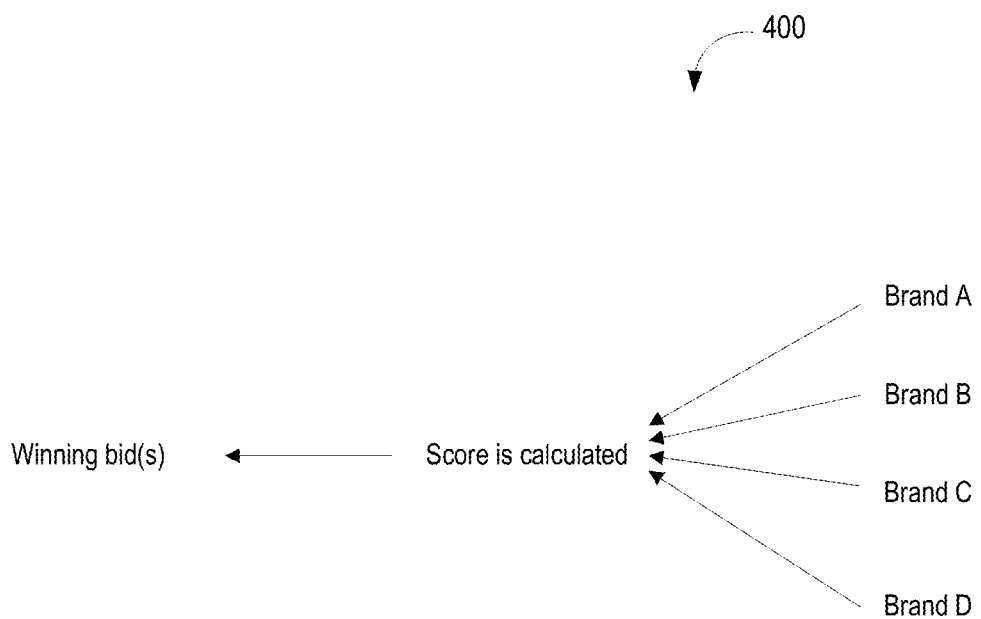

Suppliers and/or advertisers interested would then place a bid to show their message/coupon/information to the customer. The platform receives bids from the participating suppliers and/or advertisers (212), as further illustrated in FIG. 4. Suppliers and/or advertisers may decide not to place a bid. The platform scores the bids (214) based on a variety of factors including, for example, a dollar amount of the bid; previous success rate of bids (e.g. in terms of brand's past success on placing bids for this particular product, and/or its success in capturing this particular customer's attention in the past); the relevancy of the ad (e.g. a yogurt producer's coupon is more relevant to a customer looking at the yogurt shelf than Weight Watcher's ad); product life-time (often times producers offer limited-time products that have a shelf-life of only a few weeks, and the retailer is aware of that and can take it into account); quality of the ad (e.g. a producer offering 50% off, or providing a pop-up 3-D coupon might be given preference over a producer offering 1% off or a simple black and white info page); and other criteria such as retailer preferences and past relationships with various producers can also be taken into account in calculating this score.

Based on the calculated score, the platform provides the winning bid(s) to the customer's mobile device (216). The customer either purchases that product or he doesn't. The platform tracks customer behavior with respect to the promotion provided to the customer's mobile device (218). The retailer, through the promotion platform, tracks customer behavior at the checkout, e.g., to determine which promotions resulted in a purchase, and uses the information to improve the platform and provide feedback to suppliers to improve their ads, measure return on investment (ROI), improve their future bids, and future customer engagements. The feedback may also be provided to the retailer and to the platform to improve their services. If a bidding mechanism is used, the platform can help in optimizing the bids using these feedbacks.

As an alternative to the auction mechanism, the platform may identify promotions to be presented to the customer through fixed pre-set pricing schemes based on preferences and criteria set in advance by suppliers (e.g. set monthly limit of, for example, $1000 per month for an ad campaign and/or a per bid maximum of, for example, $1 per bid) or without a bidding at all, with the retailer/platform asking the advertiser/supplier in advance to pay a certain amount over a certain time period so their ad is shown during that time period.

Figure 5:
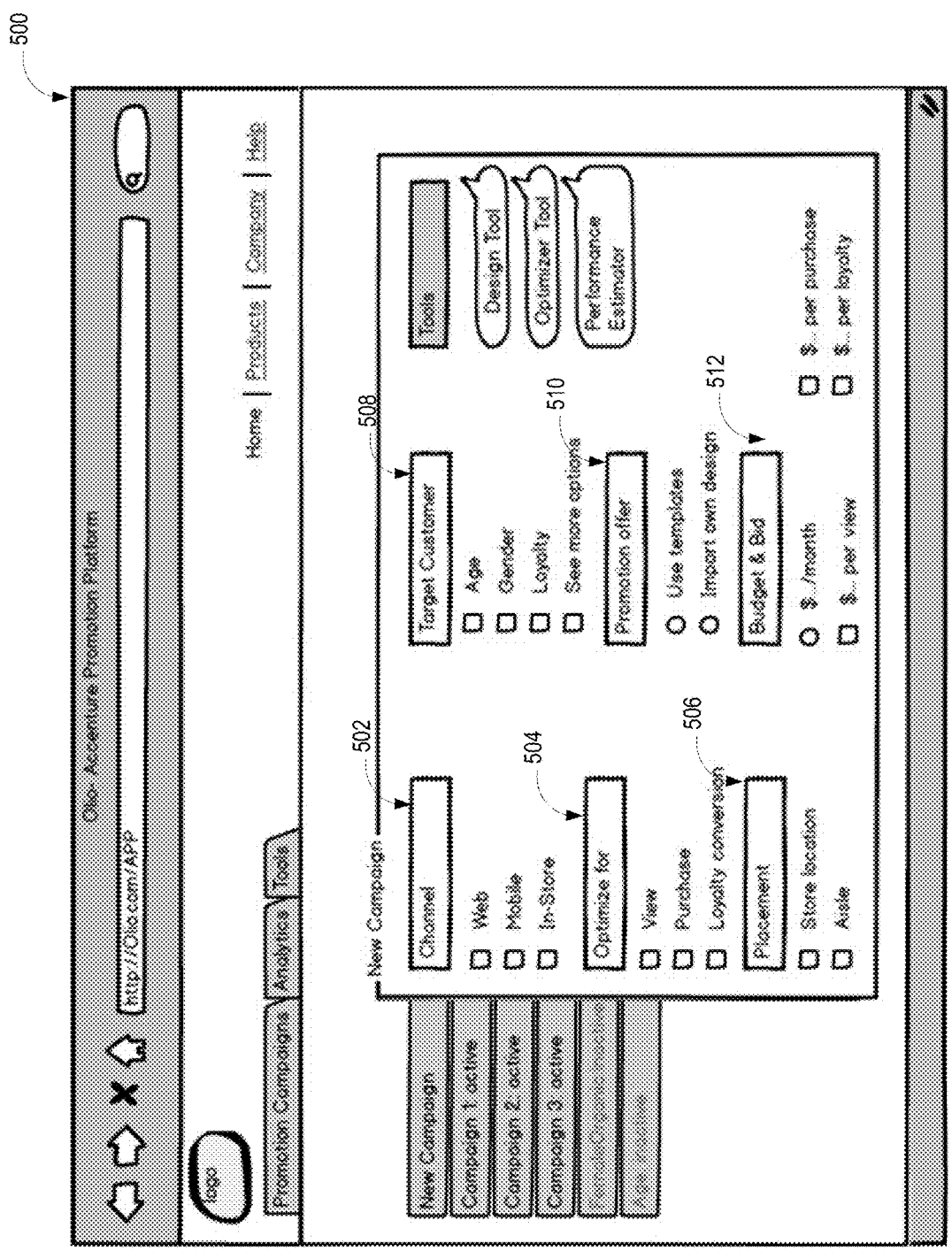
FIG. 5 shows an example of a promotion platform interface through which a supplier or advertiser may input promotion criteria.

FIG. 5 shows an example of a promotion platform interface 500 through which a supplier or advertiser may input promotion criteria. The interface 500 includes channel selection section 502 through which the supplier/advertiser may specify one or more communication channels, i.e., web, mobile, and/or in-store, for delivering promotions to a customer. The interface 500 includes an optimization section 504 through which the supplier/advertiser may specify what they want their promotion materials to be optimized for (e.g. for view, for purchase or for loyalty conversion) and by extension possibly specifying a billing scheme. The promotions may be optimized by impression/view such that the supplier/advertiser is billed when a promotion is shown or presented to a customer. The promotions may be optimized by purchase such that the supplier/advertiser is billed when a promotion results in a purchase of the supplier/advertiser's product or service. The promotions may also be optimized by loyalty conversion when a promotion results in repeat business of the customer. The optimization could be done by the platform, in terms of figuring out, for example, which customers are more likely to purchase or change loyalty if presented with a given promotion and target those, or it may be set by the advertiser. The platform may also provide tools (examples shown in FIG. 5) to, among other things, help the advertiser with this optimization, help the advertiser set up their promotion campaigns and estimate the performance of the campaigns for various parameters.

The interface 500 includes a promotion placement selection section 506 through which the supplier/advertiser may specify a location of the customer that triggers a promotion. For example, the supplier/advertiser may choose to generate promotions when a customer is in a particular aisle and/or searches for a particular product or brand. The interface 500 includes a target customer selection section 508 through which the supplier/advertiser specifies certain customer demographics it desires to target, such as age, gender, loyalty, as well as social data preferences or inferences, i.e. people who are Starbucks® fans on Facebook® can be targeted for a coffee flavored yogurt ad campaign, or people whose friends liked or bought something might be targeted. The interface 500 may also provide more target customer options such as ethnicity, income level, education, geographic location, etc.

The interface 500 includes an offer selection section 510 through which the supplier/advertiser designates whether the promotion or offer design will follow a preset template or be a custom imported design. The interface 500 may also include a budget selection section 512 through which the supplier/advertisers may designate a monthly, weekly, yearly, etc. budget for promotions presented to customers interacting with the promotion platform. The feedback can also be displayed to the advertiser through this interface, in the form of real time analytics, graphs, tables, etc.

Figure 6:
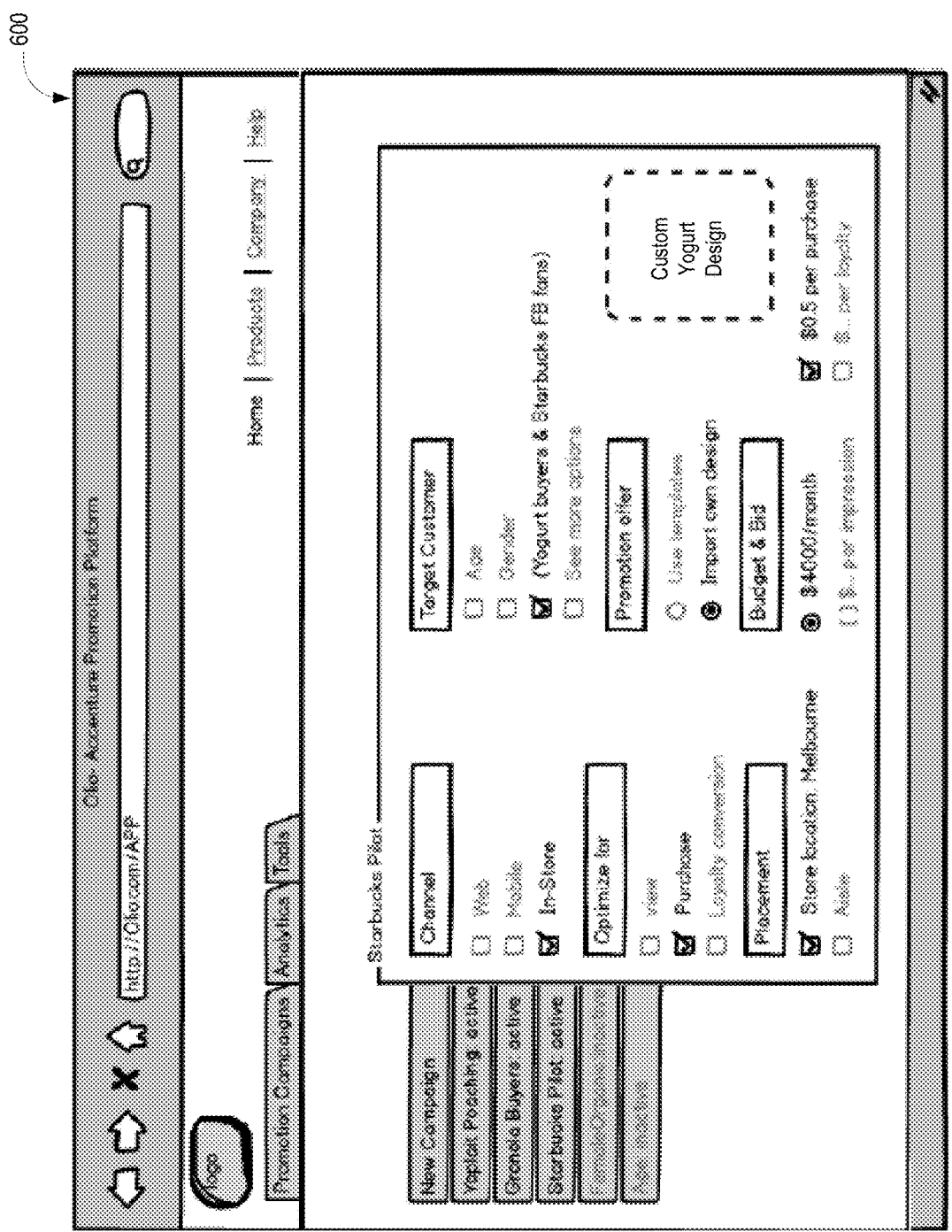
FIG. 6 shows another example of a promotion platform interface through which a supplier or advertiser may input promotion criteria.

FIG. 6 shows another example of a promotion platform interface 600 through which a supplier or advertiser may input promotion criteria. In particular, the interface 600 in FIG. 6 shows criteria selected by a supplier or advertiser.

Figure 7:
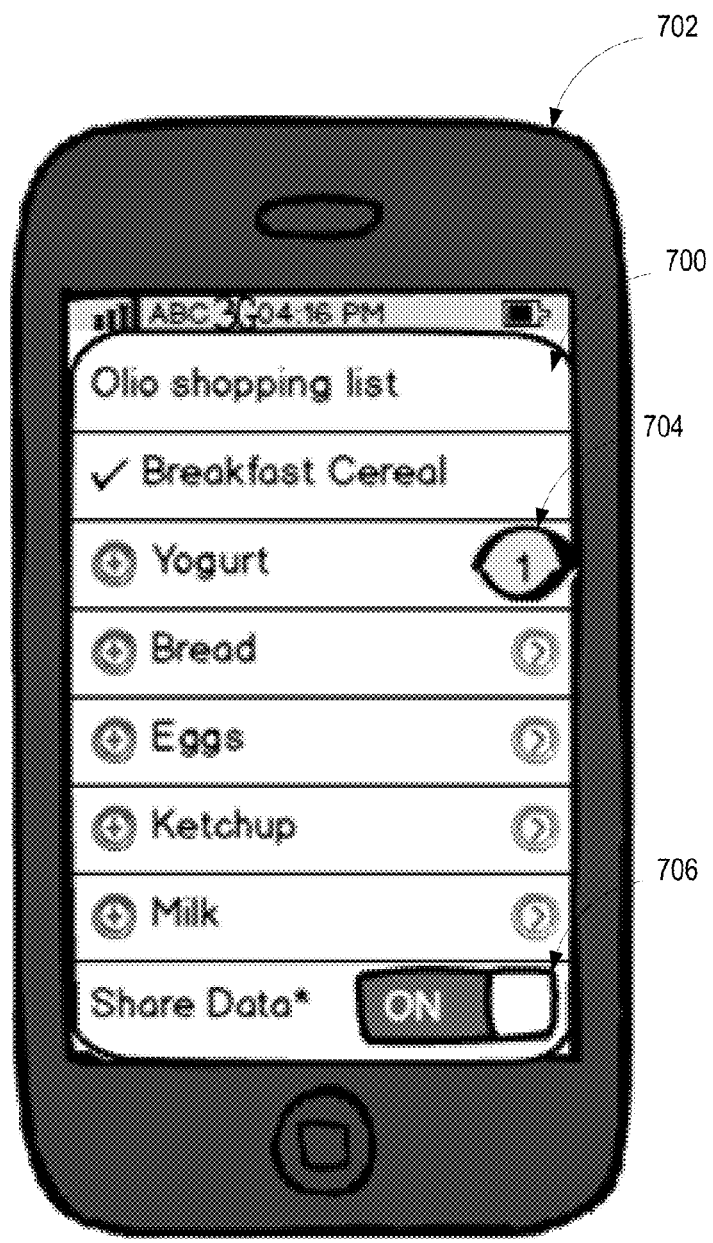
FIGS. 7-11 show examples of screenshots of a mobile application installed on a mobile device for communication via the mobile channel.
Figure 8:
Figure 9:
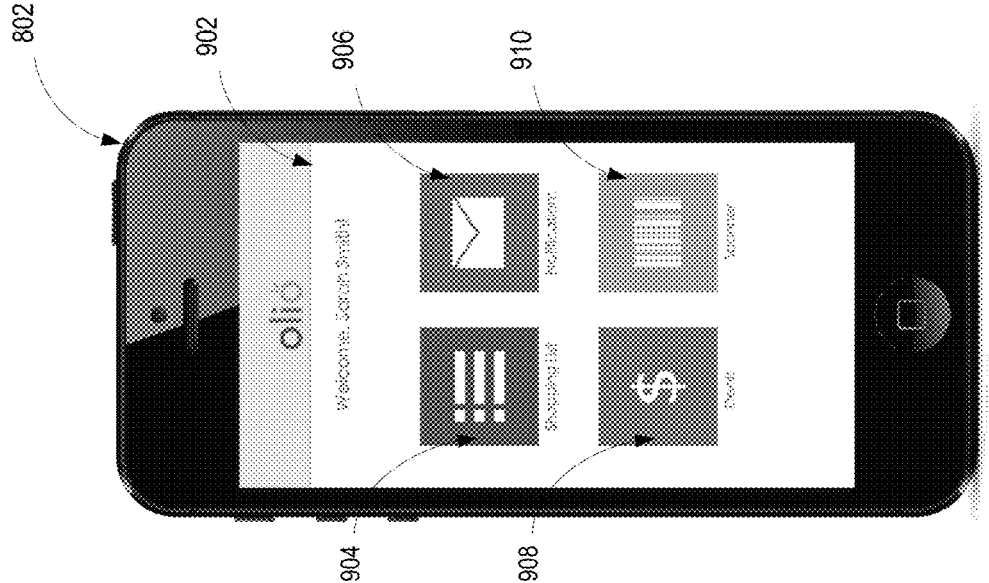

FIG. 7 shows an example of a screenshot 700 of a mobile application installed on a mobile device 702 for communication via the mobile channel. In one embodiment, when the mobile device enters the range of a beacon positioned within a store, the application may prompt the user to select whether he/she wishes to receive promotions. FIG. 8 shows an example of a screenshot 800 of a mobile application installed on a mobile device 802 that prompts the user to select whether he/she wishes to receive promotions. FIG. 9 shows an example of a screenshot 902 of the mobile application installed on the mobile device 802 showing a welcome screen. The application includes a shopping list button 904, a notifications button 906, a deals button 908, and a scanner button 910. Through the shopping list button 904 the user may input, view and modify a shopping list of desired products or services. Through the notifications button 906 the user receive notifications such as whether the mobile device 802 is within range of a wireless beacon system, whether the phone's Bluetooth capabilities are active, messages from other users that also use the same applications, etc. Through the deals button 908 the user may view promotions sent to the user by the promotion platform. Through the scanner button 910 the application allows the user to scan the bar code, QR code, or other scan-able code on a product's packaging.

Figure 10:

As the customer walks into a certain section of the store in the range of a beacon, the promotion platform recognizes the customer and accesses information about the customer, including, as examples, purchase history, social media information such as if the customer is a fan of certain products, a taste profile that specifies preferences or tastes of the customer, demographic information about the customer and shopping trends of customers with similar demographic information. For example, the location data may indicate that the customer is in the meat section of a grocery store. The promotion platform may determine that, based on the customer's purchase history, the customer is a red wine drinker, but has not purchased red wine in a while. From social media information collected about the customer, the promotion platform determines that the customer is a fan of a particular celebrity chef. From media trends the promotion platform may determine that this chef is popular with customers of a certain demographic that includes the customer, and that the chef's recently recommended a particular wine to go with a meat dish. The promotion platform may identify suppliers/advertisers of the wine product and provide the winning promotion(s) to the customer in the manner described previously. FIG. 10 shows an example of a screenshot 1002 of an application installed on the mobile device 802 including a promotion for wine sent to the customer's mobile device 802 in the manner described above.

As another example, the promotion platform may determine, using one or more of the location determining mechanisms described herein, that the customer is in the dairy section of the grocery store. From the customer's social media information the platform knows that the customer is a fan of a coffee establishment that is located nearby the grocery store. From the customer's purchase history the platform knows that the customer buys a particular brand of yogurt. The platform may make this information available to the supplier of the yogurt brand and offer a promotion to the customer whereby he/she can receive a free coffee from the coffee establishment if he/she buys a package of the particular brand of yogurt. In this manner the platform leverages the customer's preferences, history, and other information to generate promotions at the point of decision.

The application shown in FIG. 7 includes a shopping list of various products. The promotion platform may use a customer's shopping list as a factor in determining which promotions to provide to the customer. The application includes an indicator 704 when a promotion for a particular product is available. The user may click on the promotion indicator 704 to view the promotion. Alternatively, the available promotion(s) may automatically pop up in the application. The application may also provide a data sharing switch 706 that allows the user to set whether customer data is shared with the retailer and/or promotion platform. The application also allows a user to share a promotion with a friend. For example, if a promotion is sent to User 1 in the manner described herein, the application may include a "Share" option that allows User 1 to share the promotion with User 2. The promotion may be sent to User 2 via email, SMS text message, through a social networking platform, or other communication methods, or, if User 2's mobile device the installed application, directly to the application running on User 2's device. Promotions received from another user may be viewed, as an example, in the notifications section of the application, which is viewed by selecting the notifications button 906 shown in FIG. 9.

Figure 11:
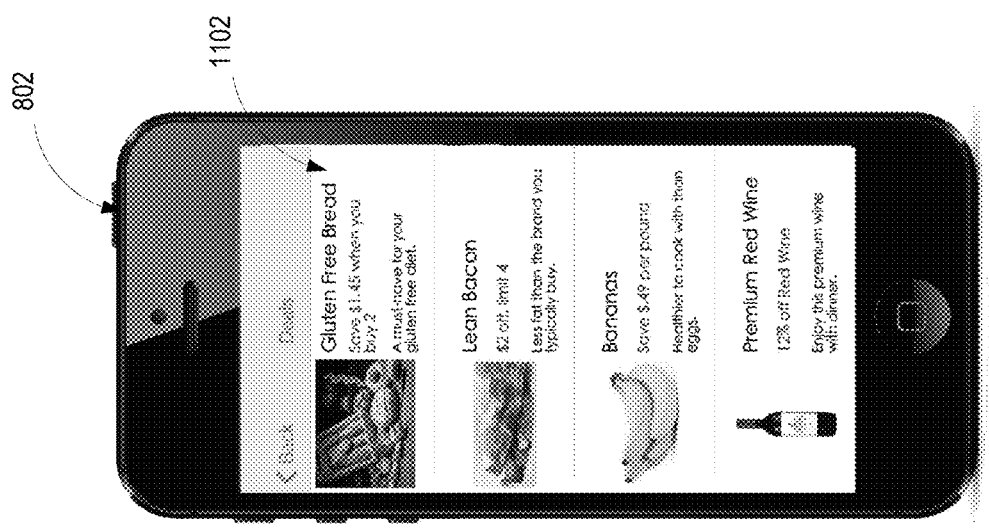

FIG. 11 shows an example of a screenshot 1102 of a "Deals" section of the mobile application installed on the mobile device 802. By selecting the deals button 908 shown in FIG. 9, the user may view the deals he/she has received over a certain period of time, such as while visiting a particular store.

In this manner, the promotion platform allows retailers utilize the vast amount of data that would be available to them about their customers, products and vendors from multiple channels in a seamless world. In doing so, the platform offers the retailers an improved layer of engagement with customers and suppliers. In retail stores, the customers often only see what is on the shelf and the suppliers and the retailers often reach agreements on the physical location of the products on the shelf. This new platform would offer a virtual layer on top of the physical shelf space, facilitating new interaction opportunities and a more personalized engagement between retailers, vendors and customers. See also alternative methods of retailer engagement with customers in U.S. Pat. No. 6,957,393, issued Oct. 18, 2005, U.S. Pat. No. 8,180,364, issued May 15, 2012, and U.S. Pat. No. 8,428,618, issued Apr. 23, 2013, which are incorporated herein by reference.

While the application has been described in terms of the retailer environment, it will be understood that the promotion platform may also be administered by third parties, such as credit card companies, product suppliers, or other entities seeking to provide targeted promotions to customers.

The platform disclosed herein also enables the retailers and/or vendors to offer time-sensitive deals to individual customers, e.g. 20% off if the purchase is made within the next two hours. In addition to an ad or coupon, the promotion or message shown to consumers may include other information, including information on which of their friends have "liked" or purchased this particular product in the past, recommendations for other products they might be interested in based on their history, taste and budget, review information from other customers, or tutorial videos on how to use a particular product or how to cook a particular vegetable.

As more relevant advertisements may be sent to a particular customer, then it is no longer necessary to send a large number of advertisements with the hope that at least one is relevant. This can reduce overall network bandwidth requirements and individual processing power and battery requirements of mobile devices and of retailer systems. In addition, since retailers will be able to monetize their foot-traffic and the physical space (or their online traffic and webpages), using this platform, it would potentially enable them to use this additional revenue to lower the margins on products available in their stores without hurting their bottom lines. As such, the prices in offline stores could become more competitive with their online counterparts.

The platform allows the suppliers/manufacturers/advertisers to show their message/coupon/ad to the customer at the moment of decision, where the customer is standing by the shelf making a decision. The intention of the user is known; she has put in the effort to make it to the store, and to a particular section within the store, which makes the ads directed to the customer in the manner described herein more likely to affect the customer's decision. Instead of presenting a customer with a coupon after check-out (e.g., by analyzing the content of their receipts and noticing they've purchased a competitor's product), the platform described herein enables the advertisers to provide customized offers to consumers prior to the point of purchase, potentially changing their behavior at the moment of decision.

In addition, the platform disclosed herein enables a new form of payment, namely pay per purchase. For example, a retailer may track the customer at the check-out and charge advertisers accordingly if the ad they shown to the customer results in a purchase. Furthermore, the platform disclosed herein may enable a pay per conversion. For example, if a regular buyer of yogurt brand A switches to brand B as the result of an ad shown to them, the retailer would know by keeping track of the customer's future purchases and can charge the advertiser accordingly.

The feedback loop component of the new platform enables the advertisers to keep track of how much they are spending per customer on advertisements, what advertisement are being shown to what groups of customers, and how much of it is being translated into purchase at the check-out. The platform thus enables the advertisers to modify the content of their future ads, or experiment their ad campaigns on a measured basis before a wider release.

In this manner, the promotion platform provides the customer with a more engaging experience with customized deals meeting his/her needs. The promotion may also provide a complementary service to online ad exchange platforms. Keywords that are not popular in online ad exchange platforms for sponsored search ads may be extremely popular in the proposed platform. For example, if search keywords like "car" would return many ads in Google, but keywords like "ice-cream" hardly return any ads because few are is interested in buying ice-cream online and as such the keyword is not that valuable to advertisers online.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system for real-time product promotions across multiple channels, comprising:
    an indoor positioning system comprising multiple beacon systems positioned at various locations within a facility that offers products for sale;
    a processor in communication with the indoor positioning system; and
    a memory comprising instructions that, when executed, cause the processor to:
        identify a mobile device associated with a customer located within the facility that offers products for sale, wherein the facility comprises multiple sections;
        identify in which of the multiple sections of the facility the mobile device associated with the customer is located based on a proximity of the mobile device associated with the customer relative to the beacon systems;
        identify one or more products offered for sale within the identified section of the facility;
        retrieve information from the mobile device including attributes of the customer including social media information of the customer, wherein the social media information of the customer includes an indication that the customer is a fan of a person;
        identify a type of a first product the person has recently recommended associated with the identified one or more products offered for sale within the identified section of the facility;
        identify suppliers or advertisers within the facility associated with the identified type of the first product;
        transmit (1) an identification of the identified type of the first product and (2) the retrieved customer attributes to one or more remote computer systems representing the suppliers or advertisers;
        receive promotion bids from the one or more remote computer systems representing the suppliers or advertisers;
        select at least one of the promotion bids as a winning bid for transmission of at least one promotion associated with the winning bid to the mobile device associated with the customer;
        generate at least one personalized promotion message including a name of the person, the first product recommended by the person, the identified type of the first product recommended by the person associated with the identified one or more products offered for sale within the identified section of the facility, and the at least one promotion associated with the winning bid; and
        transmit the at least one personalized promotion message to the mobile device associated with the customer.

2. The system of claim 1, wherein the instructions further cause the processor to generate a score for each of the received promotion bids, wherein the at least one of the promotion bids is selected as a winning bid based on the generated score for each of the promotion bids.

3. The system of claim 1, wherein the instructions further cause the processor to:
    track customer behavior after transmitting the at least one personalized promotion message to the mobile device associated with the customer; and
    provide feedback to the suppliers or advertisers based on the tracked customer behavior.

4. The system of claim 1, wherein the instructions further cause the processor to:
    track customer behavior prior to receiving the promotion bids from one or more of the suppliers or advertisers; and
    transmit the tracked customer behavior to the one or more suppliers or advertisers.

5. The system of claim 1, wherein the instructions further cause the processor to:
    determine when the customer moves to a new section within the facility;
    identify one or more products offered for sale within the new section;
    identify suppliers or advertisers associated with the identified one or more products offered for sale within the new section;

receive new promotion bids from one or more of the suppliers or advertisers associated with the identified one or more products offered for sale within the new section;

select at least one of the new promotion bids as a new winning bid for transmission of at least one new promotion associated with the new winning bid to the customer; and transmit the at least one new promotion associated with the new winning bid to the mobile device associated with the customer.

6. The system of claim 1, wherein the first product is located in a first section different from the identified section in which the mobile device associated with the customer is located.

7. The system of claim 1, wherein the social media information of the customer further comprises an indication that the customer is a fan of an establishment located nearby the facility, the establishment offering a second product for sale, and wherein the instructions further cause the processor to generate a promotion of the second product conditioned on a purchase of the first product within the facility by the customer.

8. The system of claim 1, wherein the instructions further cause the processor to generate a promotion of the first product conditioned on a purchase of the first product within a predetermined time period by the customer.

9. A non-transitory product comprising:

a memory;

instructions stored in the memory that, when executed, cause a computer processor to:

identify a mobile device associated with a customer interested in a product or service;

identify a set of products or services of interest to the customer proximate to a location of the mobile device within a retail store, wherein the location of the mobile device is identified based on a proximity of the mobile device to one or more wireless beacon systems positioned within the retail store;

retrieve information from the mobile device including attributes of the customer including social media information of the customer, wherein the social media information of the customer includes an indication that the customer is a fan of a person;

identify a type of a first product the person has recently recommended associated with the set of products or services of interest to the customer proximate to the location of the mobile device within the retail store;

identify suppliers or advertisers within the retail store associated with the identified type of the first product;

transmit an identification of the identified type of the first product to one or more remote computer systems representing the suppliers or advertisers;

receive promotion bids from the one or more remote computer systems representing the suppliers or advertisers;

generate a score for each of the received promotion bids;

select at least one of the promotion bids for transmission of at least one promotion associated with the selected at least one of the promotion bids to the mobile device associated with the customer;

generate at least one personalized promotion message including a name of the person, the first product recommended by the person, the identified type of the first product recommended by the person associated with the set of products or services of interest to the customer proximate to the location of the mobile device within the retail store, and the at least one promotion associated with the winning bid;

transmit the at least one personalized promotion message to the mobile device associated with the customer;

track customer behavior associated with the at least one personalized promotion message at a checkout to determine whether the at least one personalized promotion message results in a purchase; and provide feedback to the one or more remote computer systems representing the suppliers or advertisers based on the tracked customer behavior.

10. The non-transitory product of claim 9, wherein the first product is located in a first section of the retail store different from a section in which the mobile device associated with the customer is located in the retail store.

11. The non-transitory product of claim 9, wherein the social media information of the customer further comprises an indication that the customer is a fan of an establishment located nearby the retail store, the establishment offering a second product for sale, and wherein the instructions further cause the processor to generate a promotion of the second product conditioned on a purchase of the first product within the retail store by the customer.

12. The non-transitory product of claim 9, wherein the instructions further cause the processor to generate a promotion of the first product conditioned on a purchase of the first product within a predetermined time period by the customer.

13. A method for real-time product promotions across multiple channels, comprising:

identifying a mobile device associated with a customer located within a facility offering products for sale;

identifying one or more products within the facility that are within a predetermined distance of the customer based on a proximity of the mobile device associated with the customer to a wireless beacon system;

retrieving information from the mobile device including attributes of the customer including social media information of the customer, wherein the social media information of the customer includes an indication that the customer is a fan of a person;

identifying a type of a first product the person has recently recommended associated with the identified one or more products within the facility that are within the predetermined distance of the customer;

identifying suppliers or advertisers within the facility associated with the identified type of the first product;

transmitting an identification of the identified type of the first product to one or more remote computer systems representing the suppliers or advertisers;

receiving promotion bids from one or more of the remote computer systems representing the suppliers or advertisers;

selecting at least one promotion associated with at least one winning promotion bid for transmission to the mobile device associated with the customer;

generating at least one personalized promotion message including a name of the person, the first product recommended by the person, the identified type of the first product recommended by the person associated with the identified one or more products within the facility that are within the predetermined distance of the customer, and the at least one promotion associated with the at least one winning promotion bid; and transmitting the at least one personalized promotion message to the mobile device associated with the customer.

14. The method of claim 13, further comprising generating a score for each of the received promotion bids, wherein the at least one winning promotion bid is selected based on the generated score for each of the received promotion bids.

15. The method of claim 13, further comprising:
tracking customer behavior after transmitting the at least one personalized promotion message to the mobile device associated with the customer; and
providing feedback to the suppliers or advertisers based on the tracked customer behavior.

16. The method of claim 13, further comprising:
tracking customer behavior prior to receiving the promotion bids from one or more of the suppliers or advertisers; and
transmitting the tracked customer behavior to the one or more suppliers or advertisers.

17. The method of claim 13, further comprising:
identifying a location of the mobile device associated with the customer based on a proximity of the mobile device to one or more QR codes positioned within the facility that have been scanned by the mobile device.

18. The method of claim 13, wherein the first product is located in a first section of the facility different from a section in which the mobile device associated with the customer is located in the facility.

19. The method of claim 13, wherein the social media information of the customer further comprises an indication that the customer is a fan of an establishment located nearby the facility, the establishment offering a second product for sale, and the method further comprising:
generating a promotion of the second product conditioned on a purchase of the first product within the facility by the customer.

20. The method of claim 13, further comprising:
generating a promotion of the first product conditioned on a purchase of the first product within a predetermined time period by the customer.

* * * * *